United States Patent
King et al.

(10) Patent No.: US 8,872,616 B2
(45) Date of Patent: Oct. 28, 2014

(54) SYSTEM AND METHOD FOR REMOTE ACTIVATION WITH INTERLEAVED MODULATION PROTOCOL

(75) Inventors: Ronald O. King, Brownstown, MI (US); Riad Ghabra, Dearborn Heights, MI (US); John S. Nantz, Brighton, MI (US); Tom Q. Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 1876 days.

(21) Appl. No.: 11/536,225

(22) Filed: Sep. 28, 2006

(65) Prior Publication Data

US 2008/0079602 A1    Apr. 3, 2008

(51) Int. Cl.
G05B 23/02  (2006.01)
G08C 17/02  (2006.01)
B60R 25/24  (2013.01)

(52) U.S. Cl.
CPC .............. *G08C 17/02* (2013.01); *B60R 25/24* (2013.01)
USPC ..... 340/3.21; 340/3.1; 340/426.13; 340/4.11; 340/12.22; 455/102

(58) Field of Classification Search
USPC ................... 340/426.35–436, 825, 442, 445, 340/425–426.23, 3.21; 455/450, 509, 455, 455/516, 102
See application file for complete search history.

(56) References Cited

U.S. PATENT DOCUMENTS

| | | | |
|---|---|---|---|
| 5,079,768 A | 1/1992 | Flammer | |
| 5,245,346 A | 9/1993 | Nishimura et al. | |
| 5,751,197 A | 5/1998 | Boling, III | |
| 5,980,925 A | 11/1999 | Jampani et al. | |
| 6,101,428 A | 8/2000 | Snyder | |
| 6,169,492 B1 | 1/2001 | Dabbish | |
| 6,212,240 B1 | 4/2001 | Scheibel, Jr. et al. | |
| 6,420,967 B1 * | 7/2002 | Ghabra et al. | 340/447 |
| 6,424,056 B1 | 7/2002 | Irvin | |
| 6,519,279 B1 | 2/2003 | Abdesselem et al. | |
| 6,549,115 B1 * | 4/2003 | Daiss et al. | 340/5.31 |
| 6,586,988 B2 | 7/2003 | Arisawa | |
| 6,617,961 B1 | 9/2003 | Janssen et al. | |
| 6,624,758 B1 | 9/2003 | Omata et al. | |
| 6,629,776 B2 * | 10/2003 | Bell et al. | 374/170 |
| 6,714,119 B1 | 3/2004 | Mindl et al. | |
| 6,718,240 B1 | 4/2004 | Suda et al. | |
| 6,738,394 B1 | 5/2004 | Kreuzgruber et al. | |
| 6,885,282 B2 * | 4/2005 | Desai et al. | 340/5.61 |

(Continued)

FOREIGN PATENT DOCUMENTS

DE    10233909 A1    7/2002
EP     1187346 A2    3/2002

OTHER PUBLICATIONS

Office Action dated Aug. 19, 2009 for U.S. Appl. No. 11/536,255, filed Sep. 28, 2006, pp. 1-10.

(Continued)

*Primary Examiner* — James Yang
(74) *Attorney, Agent, or Firm* — Brooks Kushman P.C.

(57) ABSTRACT

A system and method for remote activation of a device includes, in one embodiment, transmitting a command message according to a first modulation, and transmitting a signal representing the command message for the device according to a second modulation. The signal representing the command message transmitted according to the second modulation may be transmitted within the command message transmitted according to the first modulation.

20 Claims, 3 Drawing Sheets

(56) References Cited

U.S. PATENT DOCUMENTS

| | | | |
|---|---|---|---|
| 6,885,283 | B2 | 4/2005 | O'Connor et al. |
| 6,980,925 | B2 | 12/2005 | Zheng et al. |
| 7,095,316 | B2 | 8/2006 | Kachouh et al. |
| 7,102,498 | B2 | 9/2006 | Desai et al. |
| 7,724,125 | B2 | 5/2010 | Ghabra et al. |
| 2002/0101340 | A1 | 8/2002 | Starkey |
| 2002/0171537 | A1 | 11/2002 | Ghabra et al. |
| 2003/0076221 | A1 | 4/2003 | Akiyama et al. |
| 2003/0122660 | A1* | 7/2003 | Kachouh et al. ............ 340/442 |
| 2004/0036625 | A1 | 2/2004 | Omata et al. |
| 2005/0003781 | A1 | 1/2005 | Kunz et al. |
| 2005/0083175 | A1 | 4/2005 | Yanagimoto |
| 2005/0134428 | A1 | 6/2005 | Desai et al. |
| 2005/0232376 | A1* | 10/2005 | Liem et al. ................... 375/322 |
| 2005/0272436 | A1* | 12/2005 | Trott et al. ................... 455/450 |
| 2006/0077037 | A1 | 4/2006 | Luo et al. |
| 2006/0093026 | A1 | 5/2006 | Montojo et al. |
| 2006/0125599 | A1 | 6/2006 | Ghabra et al. |
| 2006/0139158 | A1* | 6/2006 | Miller et al. ................. 340/445 |
| 2006/0232377 | A1 | 10/2006 | Witkowski |
| 2006/0267744 | A1* | 11/2006 | Baumgartner et al. .. 340/426.36 |
| 2007/0164876 | A1 | 7/2007 | Ostrander et al. |
| 2008/0079603 | A1 | 4/2008 | King et al. |
| 2008/0088411 | A1 | 4/2008 | Ghabra |
| 2009/0309753 | A1 | 12/2009 | Ghabra et al. |

OTHER PUBLICATIONS

Final Office Action dated Jun. 4, 2010 for U.S. Appl. No. 11/536,209, filed Sep. 28, 2006.

Final Office Action dated Nov. 25, 2009 for U.S. Appl. No. 11/536,290, filed Sep. 28, 2006.

Office Action dated Sep. 17, 2009 for U.S. Appl. No. 11/536,290, filed Sep. 28, 2006.

Office Action dated Oct. 28, 2009 for U.S. Appl. No. 11/536,187, filed Sep. 28, 2006.

Office Action dated Dec. 29, 2009 for U.S. Appl. No. 11/536,200, filed Sep. 28, 2006.

Office Action dated Aug. 25, 2009 for U.S. Appl. No. 11/536,209, filed Sep. 28, 2006.

Final Office Action dated Nov. 10, 2009 for U.S. Appl. No. 11/536,209, filed Sep. 28, 2006.

Notice of Allowance and Fee(s) Due mailed Feb. 4, 2010 for U.S. Appl. No. 11/536,290, filed Sep. 28, 2006.

Office Action dated Mar. 16, 2010 for U.S. Appl. No. 11/536,255, filed Sep. 28, 2006.

Final Office Action dated Jun. 23, 2010 for U.S. Appl. No. 11/536,200, filed Sep. 28, 2006.

Final Office Action dated Jun. 9, 2010 for U.S. Appl. No. 11/536,187, filed Sep. 28, 2006, pp. 1-16.

Office Action dated Oct. 5, 2010 for U.S. Appl. No. 11/536,187, filed Sep. 28, 2006, pp. 1-8.

Office Action dated Oct. 5, 2010 for U.S. Appl. No. 11/536,200, filed Sep. 28, 2006, pp. 1-19.

Office Action dated Oct. 27, 2010 for U.S. Appl. No. 11/536,209, filed Sep. 28, 2006, pp. 1-23.

Final Office Action dated Feb. 18, 2011 for U.S. Appl. No. 11/536,209, filed Sep. 28, 2006, pp. 1-21.

Final Office Action dated Mar. 10, 2011 for U.S. Appl. No. 11/536,200, filed Sep. 28, 2006, pp. 1-19.

* cited by examiner

SYSTEM AND METHOD FOR REMOTE ACTIVATION WITH INTERLEAVED MODULATION PROTOCOL

TECHNICAL FIELD

The following relates to a system and method for wireless remote activation of devices in a vehicular environment.

A detailed description and accompanying drawings are set forth below.

DETAILED DESCRIPTION

Figure 1:
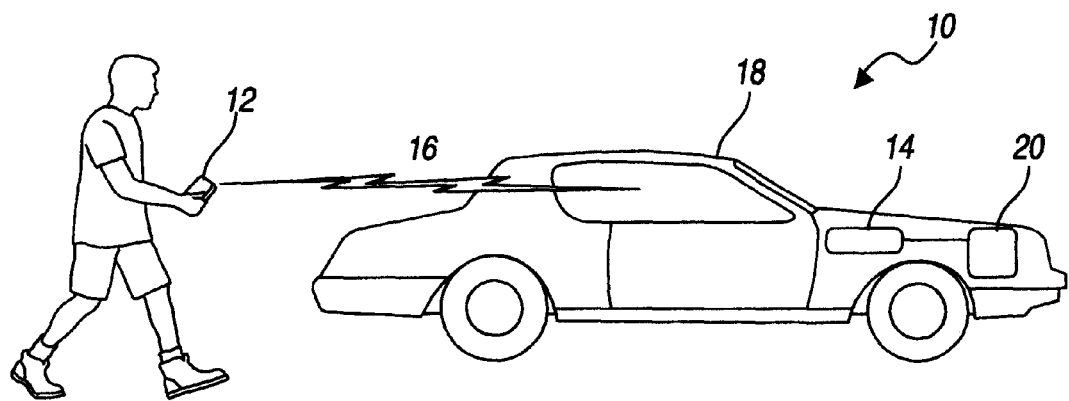
FIG. 1 is a simplified, exemplary environmental block diagram depicting one embodiment of the system described herein.

With reference to FIGS. 1-4, a more detailed description of embodiments of the system and method and various components thereof will now be provided. It is well known in the automotive industry to provide wireless communication systems in vehicles for a variety of applications. These include, but are not limited to, remote keyless entry (RKE), tire pressure monitoring, remote control of garage door opening systems, vehicle immobilization, voice activated controls, and others.

Typical RKE systems provide for remote control by a vehicle owner or user of vehicle security systems, door locks, trunk latch, exterior and/or interior lights, horn and/or alarms. Other vehicle systems or operations that may be remotely controlled by a vehicle user or owner with RKE systems include sliding-door or lift-gate control, remote engine start, vehicle interior climate control, and others.

In that regard, RKE systems for remote vehicle access and other remote operations include a remote control device or unit, which is commonly referred to as a "fob" or "key fob." The remote control device has a transmitter, and wireless radio frequency ("RF") signals are transmitted by transmitter of the remote control device that include commands for performing vehicle operations or functions such as unlocking the vehicle doors or starting the vehicle engine. Currently available RKE fobs are hand-held, portable devices, and may be separate units or may be part of an ignition key head.

Such RKE systems also typically include a receiver and/or device control unit installed in the vehicle. RF command signals transmitted by the remote control unit are received by the vehicle-mounted receiver and/or device control unit, and may be relayed to appropriate control circuitry, systems or subsystems in the vehicle in order to effectuate the desired operation or function. For example, the receiver and/or control unit may be provided in direct or indirect (e.g., over a vehicle bus) communication with door locking mechanisms to lock and unlock the vehicle doors in response to lock or unlock signals received from the remote unit. Similarly, the receiver and/or control unit may be provided in communication with other vehicle devices to control operation thereof in response to other signals received from the remote unit.

Depending upon the vehicle manufacturer, RKE transmitter and receiver technology may implement a variety of modulation schemes, such as amplitude-shift keying ("ASK") and frequency-shift keying ("FSK"). Such digital modulation schemes enable a command signal in the form of digital data to be wirelessly transmitted in an efficient manner without using impracticably large antennas. A high-frequency sinusoid, referred to as a carrier, is employed to shift the signal spectrum to higher frequencies facilitating efficient wireless signal transmission. In that regard, the spectrum of a signal can be shifted to a higher frequency by modulating the carrier by the command signal (i.e., the baseband or modulating signal). Two basic forms of modulation exist: amplitude modulation and angle modulation. Amplitude-shift keying is a form of amplitude modulation which represents digital data as variations in the amplitude of a carrier wave. Frequency-shift keying is a form of angle modulation in which the modulating signal shifts the carrier frequency between predetermined values.

Regardless of the modulation scheme implemented to transmit command signals wirelessly, the transmission must be demodulated at the receiver and/or device control unit. Demodulation removes the modulation from the digital signal, leaving the baseband signal containing the command for performing vehicle operations or functions. As previously noted, once demodulated, the RF command signals may be relayed to appropriate control circuitry, systems or subsystems in the vehicle in order to effectuate the desired operation or function.

RKE systems may be active or passive in nature. Active systems require a vehicle owner or user to manually transmit a command signal, such as by actuating one or more pushbuttons provided on the remote control unit. In passive systems, signals are automatically transmitted so that, for example, a vehicle door may be unlocked as the vehicle owner or user approaches the vehicle and/or touches the door handle to open the door, without the need for any action by the vehicle owner or user.

In that regard, in a passive keyless entry system, a remote unit, which may be referred to as a "fob" or a "card," is typically provided with a transceiver for communicating with a transceiver and/or control unit installed in the vehicle. In such systems, the remote unit carried by an operator may be used, for example, to automatically unlock the vehicle as the operator approaches the vehicle, without the need for operation of any switch or pushbutton by the operator. Similarly, the system may further be designed to automatically lock the vehicle as the operator, carrying the remote unit, moves away from the vehicle. A vehicle-mounted transceiver and/or control unit is again provided in direct or indirect communication with control circuitry, systems or subsystems to effectuate a particular operation in response to signals received from the remote unit, such as door locking mechanisms to lock and unlock the vehicle doors.

To prevent unauthorized entry into a vehicle equipped with an RKE system, command signals from remote control units are typically encrypted, such as with a rolling-code encryption scheme where a security code is transmitted with the command signal, that code being different with every transmission. The vehicle-mounted device that receives the command signals is equipped with the same rolling-code encryption scheme in order to de-crypt a received command signal and determine which security code to expect with each command signal received. As a result, even if a command signal is intercepted by a third party, that signal cannot later be re-transmitted by the third party in order to gain entry into the vehicle, since the security code transmitted with that command signal will no longer be accepted as valid by the vehicle-mounted receiver and/or control unit.

RKE systems are referred to as "one-way" systems where communication or transmission of signals only takes place from the portable remote control device having a transmitter to the vehicle-mounted device having a receiver. However, as is again well known by those of ordinary skill, RKE systems may also be "two-way" in nature. In "two-way" RKE systems, the portable remote control device carried by the vehicle user or owner includes a transceiver, and the vehicle-mounted device also includes a transceiver. As both the remote control device and the vehicle-mounted device are capable of transmitting and receiving wireless signals, two-way communication between those devices is enabled.

Signals transmitted to or from the portable remote control device and/or the vehicle-mounted device in "two-way" RKE systems are again typically encrypted for security purposes. "Two-way" RKE systems also may be either active or passive in nature.

In "two-way" RKE systems, communication from the vehicle-mounted device or unit to the portable remote control device or unit may be for any of a number of purposes, such as for prompting a passive remote control device to transmit a signal, acknowledging the receipt of a command signal from a remote unit, or others. In that regard, the remote control device or unit may be provided with a display, such as a liquid crystal or light emitting diode display, so that the vehicle owner or user can confirm that a command signal has been received by the vehicle-mounted device or unit and that the command has been effectuated (e.g., the vehicle doors have been locked/unlocked; the vehicle engine has been started).

For "two-way" RKE systems in particular, and especially those equipped for remote vehicle engine start, it is increasingly requested that such systems function at long distances from the vehicle. For example, it is often desired that such systems provide for communication between a remote unit and a vehicle control unit over ranges of more than 200 meters.

As previously noted, remote control units are hand-held, portable devices. For durability, the antenna of the remote unit is provided within a device housing, which reduces the antenna gain that can be achieved. Lower antenna gain constrains the operating range between the remote unit and the vehicle-mounted receiver and/or control unit over which transmitted signals can be reliably received.

In RF communication systems, range performance can be improved by using a low data rate for signal transmissions. Range performance can also be improved by increasing transmission power. Transmission power levels, however, are limited by Federal Communication Commission ("FCC") regulations in order to reduce interference with other signal transmissions. Transmission power can be maximized under FCC regulations by dividing or partitioning a signal into multiple packets for transmission.

It is also desirable in RKE systems, however, to minimize latency, which may be described as the time required to receive and act on a command signal. The low data rate and data partitioning described above that improve range performance in RKE systems also result in an increase in system latency.

Thus, there exists a need for an RKE systems that will enhance system range, and thus functionality, while also providing for acceptable system latency. Such an RKE system would include an interleaved modulation protocol for signal transmission where the format for signals by the remote unit include a command message transmitted according to a first modulation and a signal representing the command message transmitted according to a second modulation interleaved into the command message transmitted according to the first modulation.

Referring now to the drawings, FIG. 1 is a simplified, exemplary environmental block diagram depicting one embodiment of an RKE system (10). RKE system (10) comprises a portable remote control device or unit (12) and a vehicle-mounted device or unit (14). The remote unit (12) may be a separate fob or card, part of a vehicle ignition keyhead, or any other suitable configuration known in the art. The remote unit (12) transmits a wireless command signal (16), which may be radio frequency ("RF") signal, that includes a command message. Remote unit (12) transmits command signal (16) a distance or range (R) from the vehicle (18) in order to remotely perform a desired vehicle operation or function represented by the command message of command signal (16), such as locking or unlocking vehicle doors, activating or deactivating a vehicle security system, activating or deactivating vehicle interior and/or exterior lights, starting the vehicle engine, and/or others. Such a transmission by remote unit (12) may be in response to user input, which may be provided to remote unit (12) in any fashion known in the art, such as actuation of a push-button or by voice recognition.

Command signal (16) may be received at the vehicle-mounted device unit (14), which may be mounted at any suitable location on the vehicle (18). Vehicle-mounted device unit (14) relays the command message of the command signal (16) to an appropriate vehicle function (20) in order to effectuate the command, such as locking or unlocking vehicle doors, activating or deactivating a vehicle security system, activating or deactivating vehicle interior and/or exterior lights, starting the vehicle engine, and/or others. In that regard, vehicle function (20) may be, for example, a computer, microprocessor, control circuit, logical device, vehicle system, vehicle device, or vehicle subsystem, or other. Relay of the command message by vehicle-mounted device unit (14) may include translation of the command message of command signal (16) into an output control signal. Vehicle-mounted device unit (14) may be provided in direct communication with vehicle function (20), or may be provided in communication with vehicle function (20) indirectly, such as over a vehicle data or communications bus (not shown).

Figure 2:
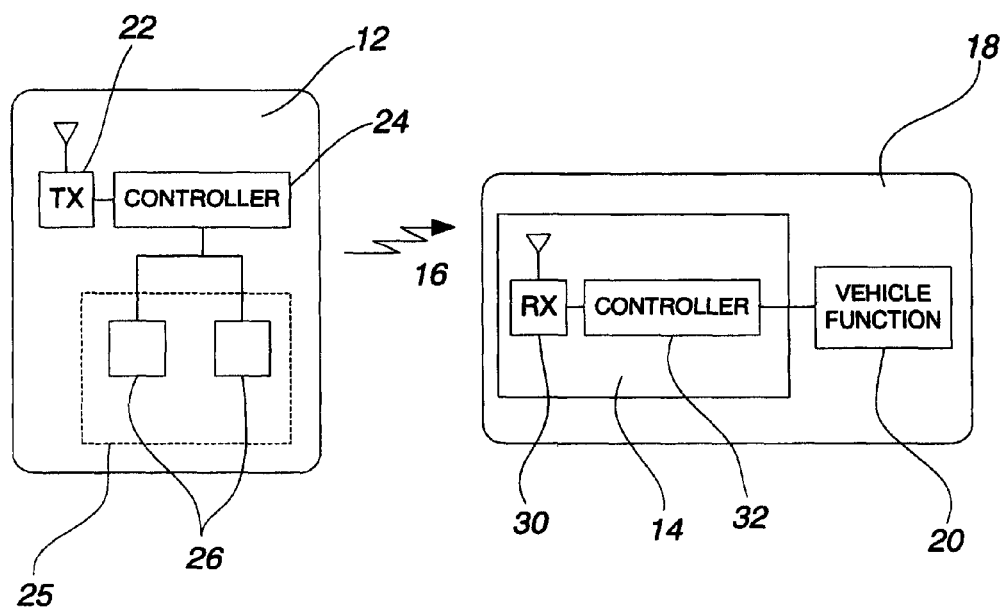
FIG. 2 is a simplified, exemplary block diagram depicting one embodiment of the system described herein.

Referring now to FIG. 2, a simplified, exemplary block diagram depicting one embodiment of an RKE system is shown. As seen therein, remote unit (12) comprises a transmitter (22) provided in communication with a controller (24). Remote unit (12) may include a user interface (25) having one or more buttons or switches (26) which allow a user to provide input to remote unit (12). For example, as illustrated in FIG. 2, user input may be provided to remote unit (12) by actuation of a push-button (26) which interfaces with controller (24). Controller (24) may be a computer, microprocessor, control circuit or other logical device which executes application programs and/or which perform other logical exercises. Controller (24) is configured in any known suitable manner to generate command signal (16), which may be in response to user input, and transmitter (22) is configured to transmit command signal (16), which may include using any encryption method (e.g., rolling code), radio frequency (e.g., 315 MHZ), encoding (e.g., Manchester) and/or any modulation scheme known in the art (e.g., on-off keyed ("OOK") modulation, other forms of amplitude-shift keyed ("ASK") modulation, frequency-shift keyed ("FSK") modulation, or others).

Vehicle-mounted device unit (14) comprises a receiver (30) operative to receive command signal (16) provided in communication with a controller (32). Controller (32) may be a computer, microprocessor, control circuit or other logical device which executes application programs and/or which perform other logical exercises. Controller (32) may be operative to process the command message of command signal (16) received from receiver (30), which may include decrypting, decoding and/or de-modulating command signal (16). Controller (32) may be provided in direct or indirect communication with vehicle function (20) in order to execute the vehicle function or operation represented by the command message of command signal (16), such as locking or unlocking vehicle doors, activating or deactivating a vehicle security system, activating or deactivating vehicle interior and/or exterior lights, starting the vehicle engine, and/or others.

As previously described, range performance can be improved in an RKE system by using a low data rate for signal transmissions, and/or by increasing signal transmission power within the limits allowed under FCC regulations by partitioning, dividing or splitting a signal into multiple packets. As also previously described, however, low data rate and data partitioning result in an increase in system latency.

Figure 3:
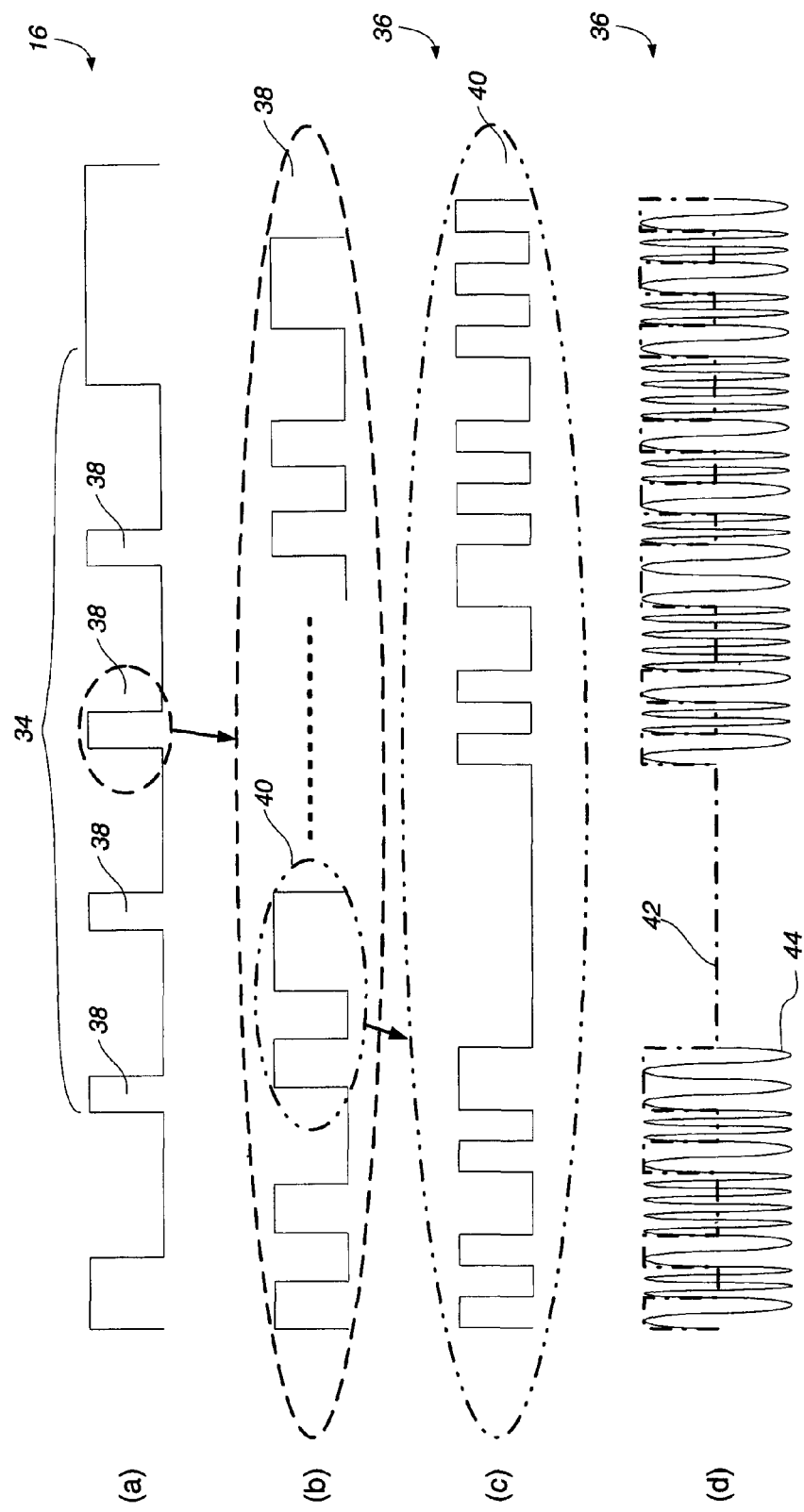
FIG. 3 is a simplified, exemplary signal diagram depicting one embodiment of the system described herein.

In that regard, upon receiving user input via a button or switch (26) indicating a desired remote function, transmitter (22) of remote unit (12) transmits the appropriate command signal (16) using an interleaved modulation protocol for maximizing range performance without impacting the system latency perceived by the user. Referring briefly to FIG. 3, transmission of the appropriate command signal (16) may include transmitting a command message (34) according to a first modulation, while simultaneously transmitting a signal (36) representing command message (34) according to a second modulation. The signal (36) representing command message (34) may be interleaved into the command message (34).

Transmitting the command message (34) according to the first modulation can increase range performance of the remote unit (12). Such a first modulation scheme may comprise a particular fashion in which the command message (34) is modulated. In that regard, examples of modulation schemes known in the art include ASK, OOK and FSK. Any of these modulation schemes or others known in the art could be used. Moreover, the command message (34) may be encoded using one of a multitude of formats for use in transmitting the command message (34) over a greater range.

Since increased range performance is desired, an appropriate format for use in transmitting the command message (34) may comprise a low data rate or bit rate, such as, for example, on the order of 1 K-bit/second. However, other low transmission data rates could be used, such as, for example, transmission bit rates in the range of approximately 500 bits/second to 2 K-bits/second. Such a format may also or alternatively comprise data partitioning. That is, the command message (34) may be divided into multiple packets by controller (24), where each packet includes a portion of the command message (34). For example, the command message (34) may be divided into four packets transmitted over a period of 400 milliseconds, where each packet may be 20 milliseconds in length, and may be transmitted serially with periods of 80 milliseconds between those packets. Other partitioning schemes or methods could also be used.

Receiver (30) of vehicle-mounted unit (14) is provided for receiving the command message (34) having the first modulation scheme and/or having the low data rate and/or partitioned into multiple packets. In that regard, where command message (34) is transmitted as multiple packets, controller (32) of vehicle-mounted device unit (14) is configured to assemble those received packets into command message (34). The command of message (34) is subsequently effectuated as previously described.

Such a low data rate and/or partitioned signal format allows for higher transmission power and more reliable reception of command signal (16) by vehicle-mounted device unit (14) over a greater range, as previously described. While system latency may increase, such increased latency is acceptable where there exists a greater distance between remote unit (12) and vehicle (18). That is, where the vehicle user operating remote unit (12) is at a greater distance from vehicle (18), a greater period of time exists for effectuating the desired remote function and the increased latency is not as perceptible to the vehicle user. Particular modulation schemes, such as, for example, ASK modulation, also improve or provide for greater operational range.

However, as previously noted, low data rate and data partitioning result in greater system latency. The increased system latency may not be acceptable where there exists a lesser distance between remote unit (12) and vehicle (18). Accordingly, signal (36) representing command message (34) may be transmitted simultaneously with the command message (34), but according to a second modulation for minimizing system latency. Such a second modulation scheme may comprise a particular fashion in which signal (36) is modulated. In that regard, examples of modulation schemes known in the art include ASK, OOK and FSK. Any of these modulation schemes or others known in the art could be used. Moreover, signal (36) representing command message (34) may be encoded using one of a multitude of alternative formats for use in transmitting signal (36) with minimal system latency.

Since minimal system latency is desired, an appropriate alternative format for use in transmitting the signal (36) representing command message (34) may comprise a high data or bit rate, such as, for example, on the order of 10 K-bits/second. However, other high transmission data rates could be used, such as, for example, transmission data rates in the range of approximately 5 K-bits/second to 20 K-bits/second.

Receiver (30) of vehicle-mounted device unit (14) is also configured to receive signal (36) transmitted according to the second modulation and/or having the high data rate simultaneously with the command message (34). The command of signal (36) representing command message (34) is again subsequently effectuated as described in detail above.

Such a high data rate protocol enables reception of command signal (16) by vehicle-mounted device unit (14) with a shorter system latency, particularly given a shorter range. That is, where the vehicle user operating remote unit (12) is in closer proximity to vehicle (18), a shorter period of time exists for effectuating the desired remote function and a shorter system latency is desired so as not to be as perceptible to the vehicle user. In addition, such a high data rate transmission at such a relatively shorter range can be undertaken using less transmission power. Particular modulation schemes, such as, for example, FSK modulation, also allow for a shorter operational range.

Thus, regardless of the input received via the button or switch (26) indicating the desired remote function or operation, transmitter (22) of remote unit (12) may transmit the appropriate command message (34) and signal (36) representing command message (34) simultaneously. In such a circumstance, the command message (34) may be transmitted according to a first modulation, such as, for example, ASK modulation. Additionally or alternatively, the command message (34) may be transmitted at a low data rate. Interleaved within the command message (34), the signal (36) representing command message (34) may be transmitted according to a second modulation, such as, for example, FSK modulation. Additionally or alternatively, the signal (36) may be transmitted at a high data rate.

Alternate ways exist for transmitting the appropriate command message (34) and signal (36) representing the command message (34) simultaneously. In such circumstances, for example, the command message (34) may be partitioned into a plurality of packets, each packet representing a portion of the command message (34), and transmitted according to a first modulation, such as, ASK modulation. Additionally or alternatively, the plurality of packets may be transmitted at a low data rate. Interleaved within at least one of the plurality of packets, the signal (36) representing command message (34) may be transmitted according to a second modulation, such as, for example, FSK modulation. Additionally or alternatively, the signal (36) may be transmitted at a high data rate.

Referring now to FIG. 3, a simplified, exemplary signal diagram illustrating one embodiment of a command signal (16) for an RKE system is shown. The command signal (16) is represented by the waveform depicted in FIG. 3(a). As seen therein, command message (34) may be partitioned into a plurality of packets (38). Each packet (38) shown in FIG. 3(a) represents a period of time in which data corresponding to a portion of the command message (34) is transmitted (e.g., 20 milliseconds). Associated with each packet (38) is a delay representing a period of "RF OFF" time (e.g., 80 milliseconds).

With regard to FIG. 3(b), an example of bits of data contained within at least one of the plurality of packets (38) is shown in an exploded view. As previously described, the bits of data correspond to a particular portion of command message (34) and may be transmitted according to a first modulation. For example, ASK modulation may be implemented to transmit the portion of command message (34) contained within the packet. Accordingly, an RF carrier may be turned on during a "1" bit and off during a "0" bit. This type of ASK modulation is referred to as On-Off Keyed ("OOK") modulation. Thus, for each packet length, the RF carrier is on only a fraction of the time.

Additionally or alternatively, the bits of data may be transmitted according to a first data rate. The first data rate may comprise a low data rate or bit rate, such as, for example, on the order of 1 K-bit/second. However, other low transmission data rates could be used, such as, for example, transmission bit rates in the range of approximately 500 bits/second to 2 K-bits/second.

Typically, in an ASK or OOK transmitted message, the "RF ON" time comprises turning on a continuous wave RF carrier at a particular operating frequency (e.g., 315 MHz). Thus, no additional data is transmitted (i.e., data in addition to the bits represented when then RF carrier is on). As previously described, however, signal (36) representing command message (34) in its entirety may be transmitted according to a second modulation within at least one of the plurality of packets (38). To better illustrate how this interleaved modulation protocol is employed, an exploded view of a section (40) of the at least one of the plurality of packets (38) is shown, by way of example, in FIGS. 3(c) and 3(d).

With regard to FIG. 3(c), section (40) of packet (38) contains bits of data corresponding to the signal (36) representing command message (34) and may be transmitted according to the second modulation. The bits of data corresponding to the signal (36) within one ore more sections (40) of packet (38) can be combined to form the signal (36) representing command message (34).

Additionally or alternatively, the bits of data corresponding to the signal (36) may be transmitted according to a second data rate. The second data rate may comprise a high data or bit rate, such as, for example, on the order of 10 K-bits/second. However, other high transmission data rates could be used, such as, for example, transmission data rates in the range of approximately 5 K-bits/second to 20 K-bits/second. The second data rate may be greater than the first data rate.

The second modulation may be employed in order to transmit data corresponding to the signal (36) interleaved within data corresponding to a portion of the command message (34). For example, FSK modulation may be implemented to transmit "1s" and "0s" making up the signal (36) representing command message (34) during the "RF ON" time of a carrier.

In that regard, the RF carrier may be switched between two different continuous wave frequencies, one of which represents a "1" and the other of which represents a "0." For example, the frequency modulation deviation may be on the order of perhaps 30 kHz. Thus, in such an example, a "1" may correspond to an RF carrier modulated at a lesser frequency (e.g., 314.970 MHz) and a "0" may correspond to an RF carrier modulated at a greater frequency (e.g., 315.030 MHz). Thus, additional data corresponding to the signal (36) may be transmitted during the "RF ON" time of a carrier using FSK instead of sending only a continuous wave RF carrier at a particular operating frequency.

The exploded section of the signal (36) transmitted according to FSK is shown, by way of example, in FIG. 3(d) and includes both the baseband or modulating signal waveform (42) as well as the modulated RF carrier signal (44) for illustrative purposes. As seen therein, a bit "1" modulates the RF carrier at the lesser frequency and a bit "0" modulates the RF carrier at the greater frequency. Thus, when the RF carrier is turned on, additional data corresponding to the signal (36) may be simultaneously transmitted (i.e., data in addition to the bit represented just by the RF carrier being "on" in the first modulation scheme). Moreover, the additional data may be transmitted at a second data rate greater than the first data rate. Of course, other forms of modulation known in the art, such as, for example, ASK and phase-shift keyed ("PSK") may be implemented to transmit the signal representing the command message.

Correspondingly, receiver (30) may also be configured to simultaneously receive, demodulate and/or decode the plurality of packets (38) transmitted according to the first modulation as well as the signal (36) representing command message (34) transmitted according to the second modulation. In that regard, for example, receiver (30) may receive the at least one of the plurality of packets (38) transmitted according to the first modulation and employ a corresponding demodulation scheme whereby a "1" is represented when the RF carrier is turned on at or near the particular operating frequency (e.g., 315 MHz) and a "0" is represented when the RF carrier is turned off. The receiver resolution in this demodulation scheme may not be sufficient to distinguish between relative frequency variances employed according to the second modulation. Thus, in the example above, an RF carrier modulated at 314.970 MHz or 315.030 MHz appear to receiver (30) to represent the same bit of data (i.e., a "1").

Notwithstanding, receiver (30) may, for example, receive the signal (36) representing command message (34), which is transmitted in its entirety within at least one of the plurality of packets (38), according to the second modulation and employ a corresponding demodulation scheme. In this demodulation scheme, receiver (30) may demodulate and/or decode additional data interleaved within the "RF ON" transmission. For example, receiver (30) may distinguish between two or more frequency variances in the RF carrier corresponding to the frequencies employed in an FSK transmission. Thus, in the example above, an RF carrier modulated at 314.970 MHz appears to receiver (30) to represent a "1" while an RF carrier modulated at 315.030 MHz appears to receiver (30) to represent a "0." Accordingly, the data corresponding to the portion of the command message (34) transmitted in the at least one of the plurality of packets (38) according to the first modulation can be reliably received. Likewise, the data corresponding to the signal (36) representing command message (34) transmitted within the at least one of the plurality of packets (38) according to the second modulation can also be reliably received simultaneously therewith.

It should be noted that the signals of FIG. 3 as described herein are exemplary only. As previously described, the command message (34) need not be partitioned into a plurality of packets for the interleaved modulation system to be functional. Rather, the command message (34) may be transmitted in whole according to a first modulation while the signal (36) representing command message (34) may be interleaved within the command message (34) and transmitted according to a second modulation.

Figure 4:
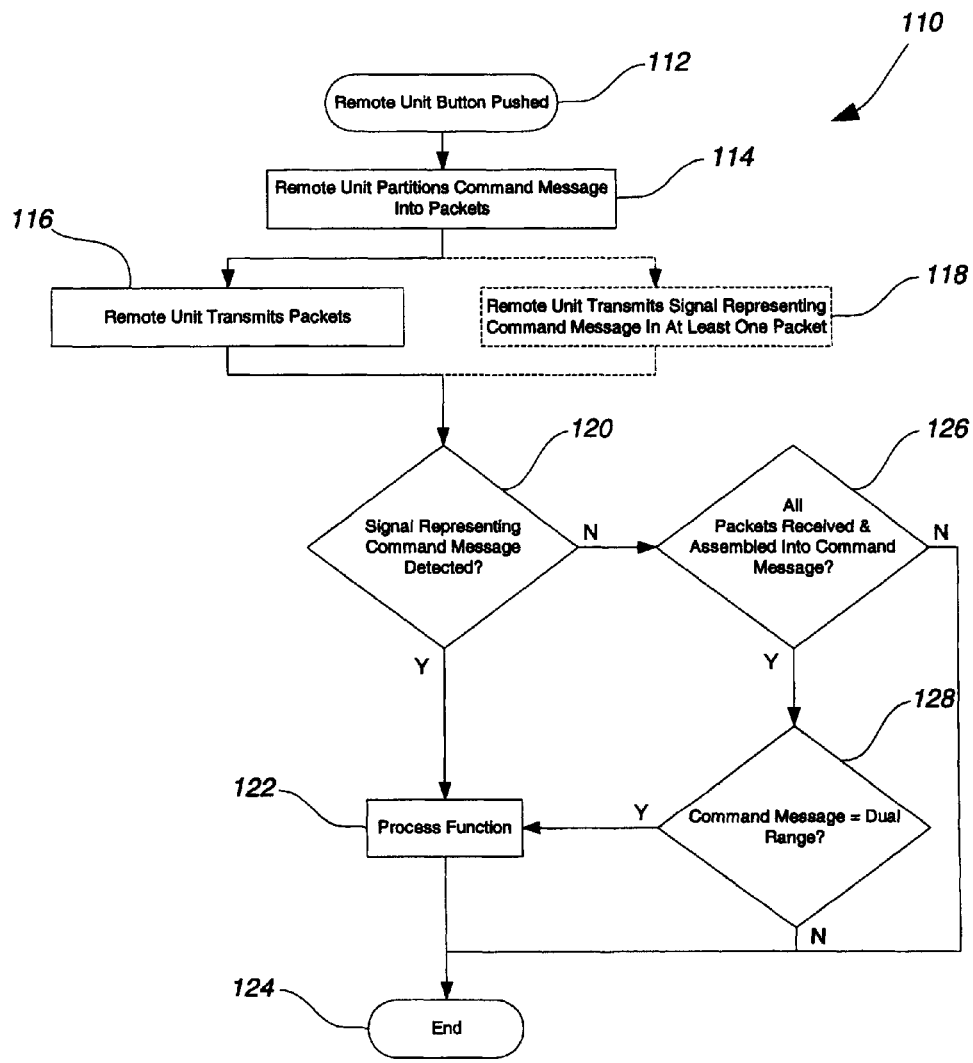
FIG. 4 is a simplified, exemplary flowchart depicting one embodiment of the method described herein.

Referring now to FIG. 4, a simplified, exemplary flowchart depicting one embodiment of an RKE method (110) is shown. As seen therein, upon user actuation of a remote unit or fob push-button (112) representing a command for a remote operation, the remote unit partitions the command message into a plurality of packets (114). The plurality of packets may then be transmitted by the remote unit according to a first modulation (116). Within at least one of the plurality of packets, a signal representing the command message may be transmitted according to a second modulation (118). Such a second modulation may be of a type where a vehicle-mounted device unit can process the signal such that the command can be enabled over a shorter range between the remote unit and the vehicle. In such a circumstance, a shorter latency may be desired for effectuating the command. Accordingly, the second modulation may comprise FSK modulation and/or the signal may be transmitted at a high data or bit rate, such as, for example, on the order of 10 K-bits/second. However, other forms of modulation (e.g., ASK or OOK, among others) and other high transmission data rates could be used (e.g., transmission data rates in the range of approximately 5 K-bits/second to 20 K-bits/second). If the signal representing the command message is transmitted from within the range that the vehicle-mounted device unit can process the signal according to the second modulation (120), then the command representing a particular vehicle function or operation may be carried out by the vehicle-mounted device unit (122). Action then ends (124).

Such a second modulation scheme implemented to transmit the signal representing the command message enables reception of the command signal by the vehicle-mounted device unit with a shorter latency, particularly given a relatively short range between the remote unit and the vehicle-mounted device unit. That is, where the vehicle user operating the remote unit is in closer proximity to the vehicle, a shorter period of time exists for effectuating the desired remote function and a shorter system latency is desired so as not to be as perceptible to the vehicle user. Such a second modulation scheme at such a relatively shorter range can also be undertaken using less transmission power. Particular high data rate protocols also allow for a shorter operational range.

Alternatively, the remote unit may be out of the range in which the device unit can process the signal transmitted according to the second modulation. In such a circumstance, however, the remote unit may still be within range of the device unit such that the device unit can process the plurality of packets transmitted according to the first modulation (126).

Processing the plurality of packets may include assembling, demodulating and/or decoding the plurality of packets into the command message. Such a first modulation may be of a type where the a vehicle-mounted device unit can process the signal such that the command can be enabled over a greater range between the remote unit and the vehicle. In such a circumstance, transmission power should be optimized as well as the receiver sensitivity.

Accordingly, the first modulation may, for example, comprise some form of ASK modulation. Transmitting the command message in a plurality of packets, as described herein, can allow for greater transmission power as well. Additionally or alternatively, the data contained within the plurality of packets may be transmitted at a low data or bit rate, such as, for example, on the order of 1 K-bit/second. Such a low data rate transmission increases the sensitivity of the device unit. However, other forms of modulation (e.g., FSK or PSK, among others) and other low transmission data rates could be used (e.g., in the range of approximately 500 bits/second to 2 K-bits/second).

Such a first modulation scheme implemented to transmit the plurality of packets which make up the command message enables reception of the command message by the vehicle-mounted device unit from greater distances, as previously described. Moreover, a partitioned signal and/or low data rate protocol may also allow for higher transmission power and more reliable reception of the command message by the vehicle-mounted device unit over a longer range. While system latency may increase, such increased latency is acceptable where there exists a greater distance between the remote unit and the vehicle. That is, where the vehicle user operating the remote unit is at a greater distance from the vehicle, a greater period of time exists for effectuating the desire remote function and the increased latency is not as perceptible to the vehicle user.

If the plurality of packets are transmitted from within a range that the device unit can process the packets according to the first modulation (126), then the device unit determines the particular command that was selected (128). If device unit determines that the particular command selected is a dual-range command, then that command representing a particular vehicle function or operation may be carried out by the device unit (122). Action then ends (124).

A dual-range command relates to a vehicle function or operation that will always be performed regardless of whether the command was received in a command message transmitted according to the first modulation or in a signal representing the command message transmitted according to the second modulation. Dual-range commands can be executed so long as the remote unit is within some range of the vehicle that device unit can receive transmissions. Such dual-range commands may include, for example, remote start, door lock, and panic, among others.

If, however, the device unit determines that the particular command selected is not a dual-range command (128), the message is ignored and action then ends (124). A command that does not qualify as a dual-range command includes commands that are preferably executed only when the remote unit is within a relatively shorter distance from the vehicle. This includes, for example, when the remote unit is in close enough proximity that the signal transmitted according to the second modulation can be processed and executed. That is, if the remote unit is out of the range in which the signal transmitted according to the second modulation can be detected, then the command may not be performed at all. Such commands may include, for example, trunk open and door unlock, among others. This helps prevent a user from accidentally pressing a FOB button that unlocks the vehicle when the user and/or remote unit is within range, but not in relative close proximity to the vehicle.

It should be noted that the method of FIG. 4 as described herein is exemplary only, and that the functions or steps of the method could be undertaken other than in the order described and/or simultaneously as may be desired, permitted and/or possible. For example, as previously described, the remote unit may transmit the command message in whole according to a first modulation, and transmit the signal representing the command message according to a second modulation within the command message transmitted according to the first modulation.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for wireless control of a device, the method comprising:
   receiving user input representing a device command;
   generating a wireless command signal including a command message corresponding to the device command;
   partitioning the wireless command signal into a plurality of packets;
   twice modulating the same plurality of packets, wherein all of the plurality of packets are modulated according to a first modulation scheme and each of the plurality of packets are modulated according to a second modulation scheme; and
   transmitting the plurality of packets, wherein the entirety of the plurality of packets conveys the command message according to the first modulation scheme and each one of the same plurality of packets conveys the same command message in its entirety according to the second modulation scheme.

2. A method for wireless control of a device, the method comprising:
   generating a signal including a command message modulated according to both a first modulation scheme and a second modulation scheme; and
   partitioning the twice modulated command message into a plurality of packets, the entirety of the plurality of packets conveying the command message according to the first modulation scheme, and at least one packet from the plurality of packets conveying the same command message in its entirety according to the second modulation scheme.

3. The method of claim 2 wherein the first modulation scheme comprises amplitude shift keyed modulation and the second modulation scheme comprises frequency shift keyed modulation.

4. The method of claim 2 further comprising:
   transmitting the plurality of packets at a first data rate, wherein the at least one packet conveying the command message in its entirety according to the second modulation scheme conveys the command message at a second data rate greater than the first data rate.

5. The method of claim 1 wherein the first modulation scheme comprises amplitude shift keyed modulation.

6. The method of claim 5 wherein the second modulation scheme comprises frequency shift keyed modulation.

7. The method of claim 1 wherein, upon transmitting the plurality of packets, the command message conveyed according to the first modulation scheme is conveyed at a first data rate, and the command message conveyed according to the second modulation scheme is conveyed at a second data rate greater than the first data rate.

8. The method of claim 7 wherein a first latency is associated with the device command for the command message conveyed at the first data rate, and a second latency is associated with the device command for the command message conveyed at the second data rate, the second latency being less than the first latency.

9. The method of claim 1 further comprising:
   receiving a single packet from the plurality of transmitted packets, the single packet conveying the command message in its entirety according to the second modulation scheme.

10. The method of claim 9 wherein the single packet conveys only a portion of the same command message according to the first modulation scheme.

11. The method of claim 1 further comprising:
    receiving all of the plurality of transmitted packets, the entirety of the plurality packets conveying the command message according to the first modulation scheme.

12. The method of claim 11 wherein each one of the plurality of packets conveys the same command message in its entirety according to the second modulation scheme.

13. The method of claim 1 wherein the entirety of the plurality of packets conveying the command message according to the first modulation scheme includes each packet comprising a portion of the command message modulated according to the first modulation scheme.

14. The method of claim 13 further comprising:
    receiving at least one of the plurality of packets comprising a portion of the command message modulated according to the first modulation scheme and the same command message in its entirety modulated according to the second modulation scheme; and
    for at least one packet of the plurality of packets, simultaneously demodulating the portion of the command message modulated according to the first modulation scheme and the same command message in its entirety modulated according to the second modulation scheme.

15. The method of claim 14 further comprising:
    executing a command corresponding to the command message conveyed in its entirety by the at least one packet according to the second modulation scheme; and
    ignoring the portion of the same command message conveyed according to the first modulation scheme within the at least one packet.

16. The method of claim 13 further comprising:
    receiving all of the plurality of packets, each comprising a portion of the command message modulated according to the first modulation scheme; and
    assembling the entire plurality of packets to produce the command message modulated according to the first modulation scheme.

17. The method of claim 16 further comprising:
    executing the device command corresponding to the command message conveyed by the entire plurality of packets according to the first modulation scheme if the device command is a door lock command.

18. The method of claim 16 further comprising:
    ignoring the device command corresponding to the command message conveyed by the entire plurality of packets according to the first modulation scheme if the device command is a door unlock command.

19. The method of claim 2, wherein the entirety of the plurality of packets conveying the command message according to the first modulation scheme includes each packet comprising a portion of the command message modulated according to the first modulation scheme.

20. A method for wireless data transmission comprising:
generating a wireless signal including a message, the wireless signal comprising a plurality of data packets all modulated using a first modulation scheme and each of the same plurality of data packets modulated using a second modulation scheme, the entirety of the plurality of data packets conveying the message according to the first modulation scheme and each one of the plurality of data packets conveying the same message according to the second modulation scheme.

\* \* \* \* \*